(12) United States Patent
Park et al.

(10) Patent No.: US 9,014,073 B2
(45) Date of Patent: Apr. 21, 2015

(54) METHOD OF ALLOCATING RESOURCE FOR RELAY

(75) Inventors: Kyu Jin Park, Gyeonggi-do (KR); Jae Hoon Chung, Gyeonggi-do (KR); Han Kyu Cho, Gyeonggi-do (KR); Yeong Hyeon Kwon, Gyeonggi-do (KR); Sung Ho Moon, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 914 days.

(21) Appl. No.: 13/142,266

(22) PCT Filed: Dec. 24, 2009

(86) PCT No.: PCT/KR2009/007790
§ 371 (c)(1),
(2), (4) Date: Oct. 20, 2011

(87) PCT Pub. No.: WO2010/074536
PCT Pub. Date: Jul. 1, 2010

(65) Prior Publication Data
US 2012/0113884 A1    May 10, 2012

Related U.S. Application Data

(60) Provisional application No. 61/140,619, filed on Dec. 24, 2008, provisional application No. 61/148,373, filed on Jan. 29, 2009, provisional application No. 61/186,663, filed on Jun. 12, 2009, provisional application No. 61/219,383, filed on Jun. 23, 2009, provisional application No. 61/220,594, filed on Jun. 26, 2009.

(51) Int. Cl.
*H04H 20/71*    (2008.01)
*H04W 4/00*    (2009.01)
(Continued)

(52) U.S. Cl.
CPC ............... *H04L 1/0003* (2013.01); *H04B 7/00* (2013.01); *H04B 7/14* (2013.01); *H04L 1/0009* (2013.01);
(Continued)

(58) Field of Classification Search
None
See application file for complete search history.

(56) References Cited

U.S. PATENT DOCUMENTS

2006/0046643 A1    3/2006    Izumikawa et al.
2007/0109962 A1    5/2007    Leng et al.
(Continued)

FOREIGN PATENT DOCUMENTS

EP    1916782    4/2008

OTHER PUBLICATIONS

LG Electronics, "Resource Allocation and Downlink Control Channel Structure for Relay Backhaul Link," 3GPP TSG RAN WG1 Meeting #57, R1-092115, May 2009, 7 pages.
(Continued)

*Primary Examiner* — Brandon Renner
*Assistant Examiner* — Kodzovi Acolatse
(74) *Attorney, Agent, or Firm* — Lee, Hong, Degerman, Kang & Waimey

(57) ABSTRACT

A method for wireless backhaul communication between a base station and a relay is disclosed. The base station enables a physical control channel to be set up, separately from the terminal that is used to transmit control information to each relay and the physical downlink control channel that has been set up. The base station can transmit data to the relay based on this control information. In a special embodiment, physical downlink control channel transmissions can be minimized by prescribing in advance the transmission of control information between the base station and the relay.

20 Claims, 14 Drawing Sheets

(51) Int. Cl.
  *H04L 1/00*   (2006.01)
  *H04L 5/00*   (2006.01)
  *H04B 7/00*   (2006.01)
  *H04B 7/14*   (2006.01)
  *H04L 1/18*   (2006.01)

(52) U.S. Cl.
  CPC ............. *H04L 1/1861* (2013.01); *H04L 5/0053* (2013.01); *H04L 5/0094* (2013.01); *H04L 2001/0097* (2013.01)

(56) References Cited

U.S. PATENT DOCUMENTS

| | | | |
|---|---|---|---|
| 2008/0070582 A1* | 3/2008 | Cai | 455/450 |
| 2008/0207193 A1* | 8/2008 | Oh et al. | 455/422.1 |
| 2010/0008282 A1* | 1/2010 | Bhattad et al. | 370/312 |
| 2010/0120442 A1* | 5/2010 | Zhuang et al. | 455/450 |
| 2010/0150173 A1* | 6/2010 | Yu et al. | 370/474 |
| 2010/0158142 A1* | 6/2010 | Yu et al. | 375/260 |

OTHER PUBLICATIONS

Panasonic, "Semi-static, dynamic and hybrid CCE aggregation," 3GPP TSG-RAN WG1 Meeting #50, R1-073609, Aug. 2007, 8 pages.
Qualcomm Europe, "Support of Rel-8 UEs by LTE-A Relays," 3GPP RAN WG1 #55, R1-084384, Nov. 2008, 20 pages.
Ericsson, "Begin—end representation of scheduling allocations," TSG-RAN WG1 #49bis, R1-073052, Jun. 2007, 2 pages.
The State Intellectual Property Office of the People's Republic of China Application Serial No. 200980152530.5, Office Action dated Jul. 3, 2013, 7 pages.

* cited by examiner

METHOD OF ALLOCATING RESOURCE FOR RELAY

CROSS-REFERENCE TO RELATED APPLICATIONS

This application is the National Stage filing under 35 U.S.C. 371 of International Application No. PCT/KR2009/007790, filed on Dec. 24, 2009, which claims to the benefit of U.S. Provisional Application Ser. Nos. 61/220,594, filed on Jun. 26, 2009, 61/219,383, filed on Jun. 23, 2009, 61/186,663, filed on Jun. 12, 2009, 61/148,373, filed on Jan. 29, 2009, and 61/140,619, filed on Dec. 24, 2008, the contents of which are all hereby incorporated by reference herein in their entirety.

FIELD OF THE INVENTION

The present invention relates to a method for allocating resources for wireless communication and more particularly, to a method for allocating a predetermined amount of channel resources to a relay at a Base Station (BS).

BACKGROUND ART

In a typical wireless communication system, since signals are transmitted and received between a fixed BS and a User Equipment (UE) via a direct link, a highly reliable radio link can be readily established between the BS and the UE. However, wireless network configuration is not so flexible due to the fixed positions of BSs in the wireless communication system. In addition, it is difficult to provide an efficient communication service in a wireless environment experiencing fluctuations in the number of required calls. To overcome these shortcomings, a multi-hop relay data transmission scheme can be implemented through fixed relays, mobile relays, or general UEs in the typical wireless communication system.

FIG. 1 schematically illustrates the configuration of a wireless communication network using relays.

Referring to FIG. 1, a multi-hop relay wireless communication system can reconfigure a network by rapidly coping with a communication environmental change and manage the whole wireless network more efficiently. For example, the multi-hop relay wireless communication system can extend cell coverage and increase system capacity. That is, when the channel state between a BS and a UE is poor, a multi-hop relay path is established through relays by installing the relays between the BS and the UE. Thus, a radio channel in a better channel state can be provided to the UE.

Furthermore, the multi-hop relay scheme may provide a high-speed data channel and extend cell coverage at a cell edge in a poor channel state with the BS.

In this manner, relays were introduced to eliminate propagation shadowing areas and are widely used at present in mobile communication systems. Compared to conventional relays limited to the repeater function of simply amplifying a signal and transmitting the amplified signal, more advanced relays have recently been developed.

The relay technology is a necessity for extending service coverage and increasing data throughput, while reducing BS installation cost and backhaul network maintenance cost in future-generation mobile communication systems. Along with the gradual development of the relay technology, there exists a need for supporting relays used for a conventional wireless communication system in a new wireless communication system.

DETAILED DESCRIPTION OF THE INVENTION

Technical Problem

An object of the present invention devised to solve the conventional problem is to provide a method for dynamically or semi-statically allocating resources for a control channel and a shared channel to one or more relays at a BS.

Another object of the present invention is to provide a method for allocating resources so as to reduce the number of blind searches for each relays at a BS, when the BS allocates resources to relays.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for includes a method for transmitting a signal for wireless backhaul communication to one or more relays at a BS includes transmitting control information to the one or more relays on a second Physical Downlink Control Channel (R-PDCCH) in a resource area other than a resource area of a first Physical Downlink Control Channel (PDCCH) established between the BS and a UE, and transmitting data to the one or more relays according to resource allocation information of the R-PDCCH.

In another aspect of the present invention, a method for transmitting a signal for wireless backhaul communication to one or more relays at a BS includes transmitting control information for wireless backhaul communication with the one or more relays to the one or more relays by signaling of a layer higher than a physical layer, and transmitting data to the one or more relays using control information predefined by the higher-layer signaling.

In a further aspect of the present invention, a method for transmitting a signal for wireless backhaul communication to one or more relays at a BS includes transmitting control information and data to the one or more relays in a predefined primary backhaul region, and transmitting data or control information that has not been transmitted in the primary backhaul region, in a secondary backhaul region to the one or more relays. The primary backhaul region includes a physical control channel and a physical data channel, and the physical control channel of the primary backhaul region includes information about the secondary backhaul region allocated to each of the one or more relays.

The above embodiments are part of preferred embodiments of the present invention. Obviously, it is to be understood to those having ordinary knowledge in the art that various embodiments having the technical features of the present invention can be implemented on the detailed description of the present invention as set forth herein.

Effects of the Invention

According to an aspect of the present invention, a BS can efficiently conduct backhaul communication with one or more relays.

According to an aspect of the present invention, a relay can reduce the number of blind searches for a control channel to receive control information.

It will be appreciated by persons skilled in the art that that the effects that could be achieved with the present invention are not limited to what has been particularly described hereinabove and other advantages of the present invention will be more clearly understood from the following detailed description.

BEST MODE FOR CARRYING OUT THE INVENTION

Figure 1:
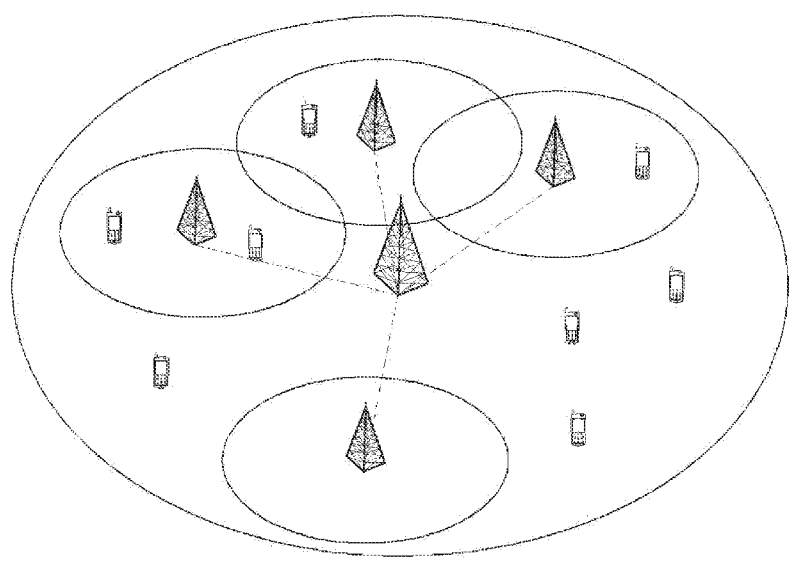
FIG. 1 schematically illustrates the configuration of a wireless communication network using relays.

The present invention relates to a wireless access system supporting a relay for wireless communication between a Base Station (BS) and a User Equipment (UE) in order to provide an efficient communication service in a radio environment experiencing fluctuations in traffic distribution or the number of required calls.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

In the embodiments of the present invention, a description has been mainly made of resource allocation for data transmission and reception between a BS and a relay and between a relay and a UE. A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an eNode B (eNB), an access point, etc. The term 'relay' may be replaced with a relay station, a relay node, etc. The term 'Mobile Station (MS)' may be replaced with a UE, a Subscriber Station (SS), a Mobile Subscriber Station (MSS), a mobile terminal, etc.

A transmitter is a node that provides a data or voice service and a receiver is a node that receives a data or voice service. Therefore, a UE may serve as a transmitter and a BS may serve as a receiver, on an uplink. Likewise, the UE may serve as a receiver and the BS may serve as a transmitter, on a downlink.

In the present invention, a UE may be any of a Personal Digital Assistant (PDA), a cellular phone, a Personal Communication Service (PCS) phone, a Global System for Mobile (GSM) phone, a Wideband CDMA (WCDMA) phone, a Mobile Broadband System (MBS) phone, etc.

The embodiments of the present invention may be achieved by various means, for example, hardware, firmware, software, or a combination thereof.

In a hardware configuration, methods according to embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present invention may be implemented in the form of a module, a procedure, a function, etc. that performs the above-described functions or operations. Software code may be stored in a memory unit and executed by a processor. The memory unit is located at the interior or exterior of the processor and may transmit and receive data to and from the processor via various known means.

Specific terms used in the following description are provided to help the understanding of the present invention and can be replaced with other forms within the scope and spirit of the present invention.

For example, a downlink physical control channel on which a BS transmits control information to a relay is referred to as a Relay-Physical Downlink Control Channel (R-PDCCH), and a downlink physical shared channel on which the BS transmits data to the relay is referred to as a Relay-Physical Downlink Shared Channel (R-PDSCH) in the embodiments of the present invention.

In general, when a BS wirelessly communicates with a UE via a relay, wireless backhaul transmission may be performed between the BS and the relay. To transmit data to and receive data from the UE and the relay, the BS allocates a predetermined amount of channel resources to the UE and the relay. A predetermined area of a superframe configured with the allocated channel resources is used as a PDCCH for transmitting to a UE control information such as a DL scheduling grant provided at a first layer (Layer 1) and a second layer (Layer 2) of the BS and another area of the superframe is used as a PDSCH for carrying data. Meanwhile, since the relay cannot receive control information on the PDCCH from the BS, the BS may allocate channel resources separately to transmit control information to a plurality of relays. The channel resources may be referred to as an R-PDCCH.

The present invention pertains to a channel allocation method for wireless backhaul communication between a BS and a relay.

Embodiment 1

In accordance with embodiments of the present invention, a new PDCCH may be configured in a subframe to transmit control information to relays, with backward compatibility to LTE rel-8 according to the quality and traffic load of a wireless backhaul link. A physical control channel may be configured for relays at a predetermined position or at a variable position in a subframe.

Figure 2:
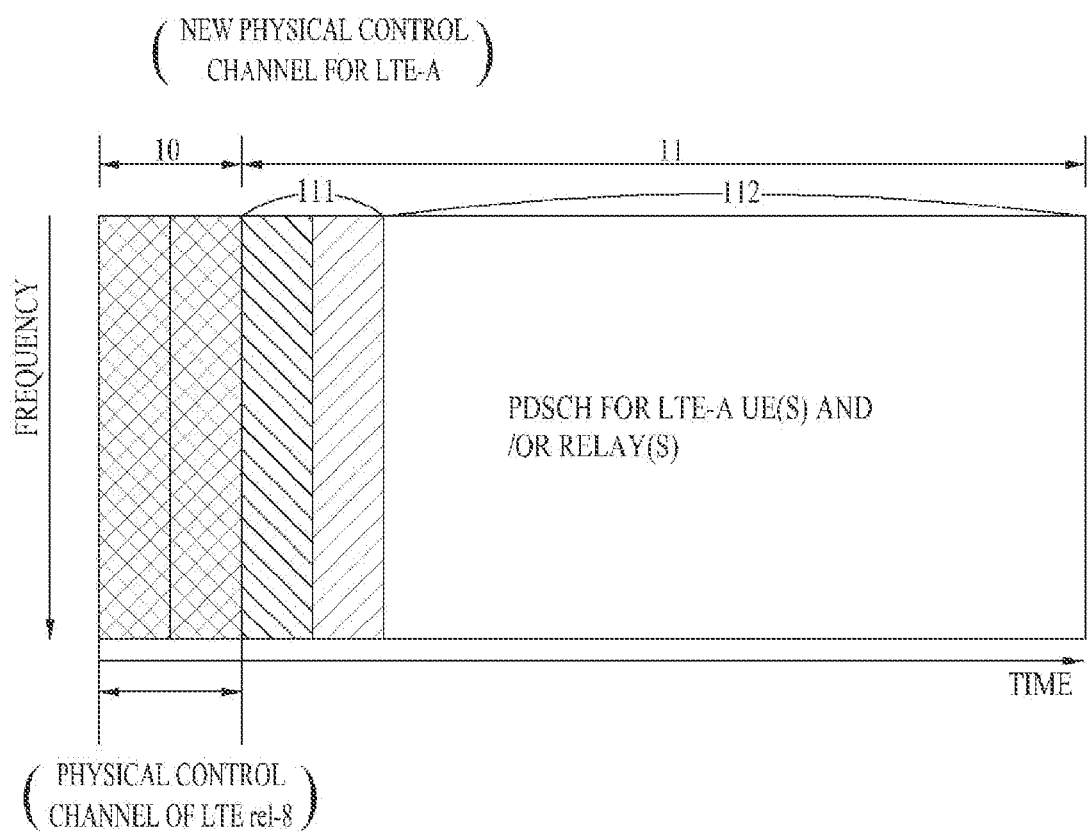
FIG. 2 illustrates an exemplary frame structure for a BS according to an embodiment of the present invention.

FIG. 2 illustrates an exemplary frame structure according to an embodiment of the present invention.

According to the embodiment of the present invention, it is assumed that a BS allocates resources to each relay according to the traffic load of the relay in the same manner as it allocates resources to a UE and signals the allocated resources to the relay on a physical control channel. It is also assumed that a new physical control channel is added for relays, with backward compatibility to an LTE Release 8 system. The subframe structure illustrated in FIG. 2 is based on the premise that a physical control channel on which a BS transmits control information to a relay is multiplexed with a physical control channel on which the BS transmits control information to an LTE Release 8 UE in Time Division Multiplexing (TDM) method.

Referring to FIG. 2, a predetermined region 10 of a subframe corresponds to a PDCCH used for a BS to transmit control information to a UE. The PDCCH region 10 may occupy two or more symbols. The BS may allocate a predetermined amount of channel resources to each of a plurality of relays according to the traffic load of the relay and may configure a predetermined area 111 of the remaining region 11 of the subframe except the PDCCH region as a new physical control channel region for transmitting control information to relays, that is, an R-PDCCH region. The remaining area 112 of the subframe is configured as a PDSCH region for data transmission to UEs and/or relays. That is, the R-PDCCH region may be multiplexed in TDM with the R-PDSCH or PDSCH region.

For example, if a macrocell subframe is configured as a fake-Multicast/Broadcast Single-Frequency Network (fake-MBSFN) subframe, the BS may configure an R-PDCCH region and an R-PDSCH region for a plurality of relays in TDM method in the remaining MBSFN data region used for data transmission, except a predetermined area set for transmitting control information to UEs.

Figure 3:
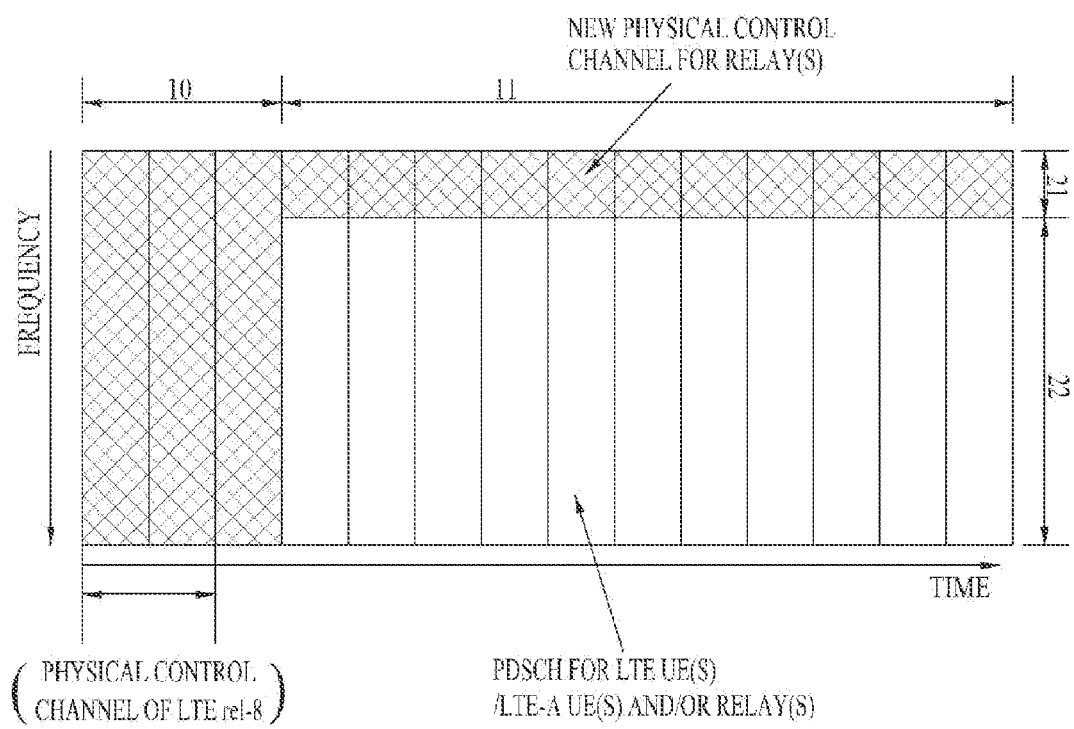
FIG. 3 illustrates another exemplary frame structure for a BS according to the embodiment of the present invention.

FIG. 3 illustrates another exemplary downlink subframe structure according to the embodiment of the present invention. As in the embodiment illustrated in FIG. 2, this embodiment of the present invention is also based on the assumption that a BS transmits control information to a relay on a physical control channel in the same manner as the BS allocates resources to a UE and thus configures an R-PDCCH to transmit control information to the relay. Specifically, a physical control channel for transmitting control information to a UE and a relay may be multiplexed in Frequency Division Multiplexing (FDM) method with a physical shared channel for data transmission to the UE and the relay in the subframe structure according to the embodiment of the present invention.

Referring to FIG. 3, a subframe may include a PDCCH region 10 occupying a predetermined number of symbols in the time domain to transmit control information and a PDSCH/R-PDCCH region 11 for transmitting data/control information to a UE or a relay. In accordance with the embodiment of the present invention, a predetermined area 21 corresponding to a specific frequency band in the frequency domain in the PDSCH/R-PDCCH region 11 is configured as an R-PDCCH region for transmitting control information to a plurality of relays. The BS transmits data to an LTE/LTE-A UE or relays in the remaining region 22 except the R-PDCCH region 21 for relays. That is, a new physical control channel for a relay is multiplexed in FDM with a physical shared channel in the subframe illustrated in FIG. 3.

Figure 4:
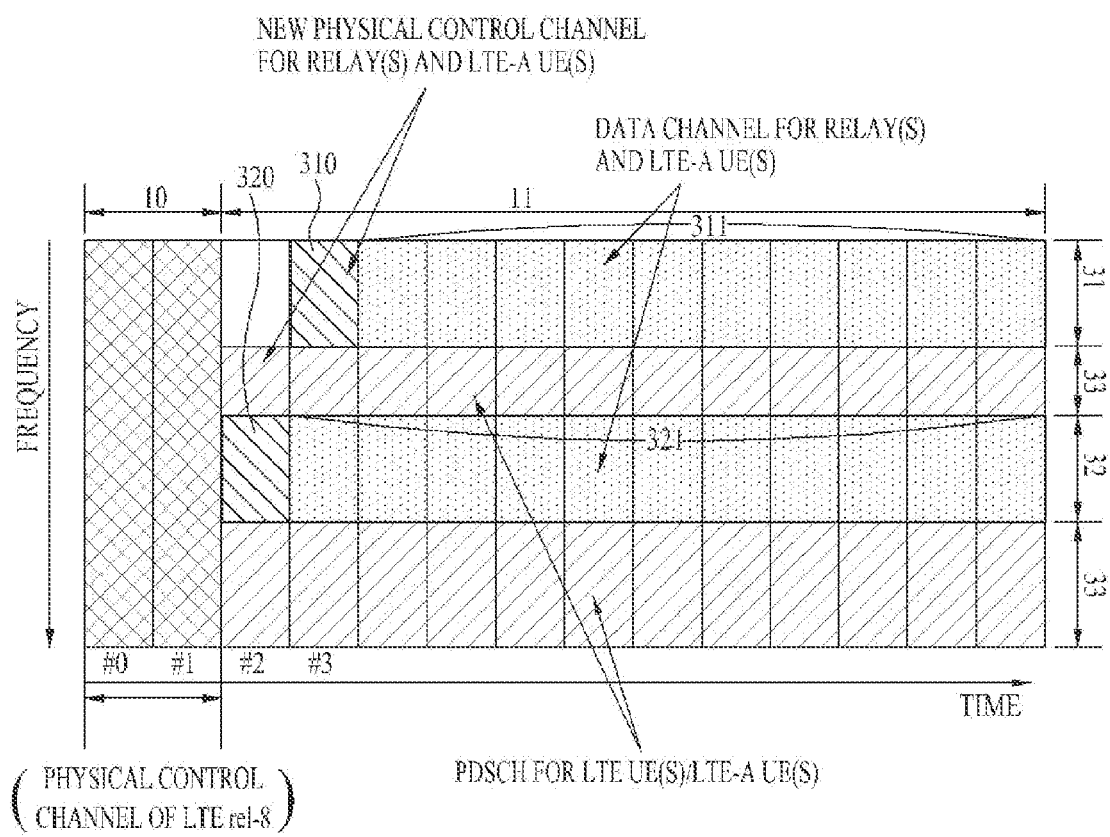
FIG. 4 illustrates a further exemplary frame structure for a BS according to the embodiment of the present invention.

FIG. 4 illustrates a further exemplary subframe structure used in a BS according to the embodiment of the present invention. Specifically, FIG. 4 illustrates an example of configuring each channel in TDM and FDM in a frame structure according to the embodiment of the present invention.

Referring to FIG. 4, a subframe starts with a PDCCH region 10 having predetermined symbols, as stated before. The remaining subframe region 11 is allocated as a PDSCH region used for a BS to transmit data to UEs. An area 31 corresponding to a specific frequency band is configured in FDM as a channel resource allocation area for relays in the PDSCH region 11. Two or more channel regions for relays may be configured at different positions in a subframe, as illustrated in FIG. 4. In a channel region allocated to each relay, a symbol is configured as an R-PDCCH region and the other symbol(s) is/are configured as an R-PDSCH region, whereby the R-PDCCH region may be multiplexed in TDM method with the R-PDSCH region.

For example, as illustrated in FIG. 4, a symbol 310, that is, symbol #3 is allocated to an R-PDCCH for control information transmission and the other symbols 311 are allocated to an R-PDSCH in the first region 31 allocated for relay(s). A symbol 320, that is, symbol #2 is allocated to an R-PDCCH for control information transmission and the other symbols 321 are allocated to an R-PDSCH in a second region 32. In the remaining subframe region 33, a PDSCH region may be configured to transmit data to LTE/LTE-A UEs.

The subframe structure illustrated in FIG. 4 is purely exemplary for illustrative purposes to describe the present invention. Thus, a specific frequency band and the indexes of symbols carrying control information in the specific frequency band may vary depending on BS settings.

A plurality of relays perform blind search on a frequency band/symbol region corresponding to an R-PDCCH in channel resources allocated according to an embodiment of the present invention, such as a subframe illustrated in FIG. 2, 3 or 4, using relay identification information.

As illustrated in FIGS. 2, 3 and 4, when a subframe is configured so that the BS transmits control information to a plurality of relays in a predetermined R-PDCCH region, each of the relays searches for an R-PDCCH directed to the relay to receive control information for it from the BS. The BS may specify a search space separately for each relay and may signal the specified search space to the relay by a higher-layer signal generated in a higher layer such as a Radio Resource Control (RRC) layer. Alternatively or additionally, a search space in which each relay performs blind search may be configured, cell-specifically and its information may be broadcast to all relays in cell-specific system information or unicast to each relay by a higher-layer signal. The relay-specific search space or cell-specific search space signaled to each relay is configured in units of a predetermined Resource Block (RB). In this case, the index of a symbol allocated as the R-PDCCH region may be explicitly or implicitly signaled.

Hereinbelow, a description will be given of a resource mapping method and a blind search method according to an embodiment of the present invention, when a BS allocates a predetermined amount of channel resources to a relay, for wireless communication between them.

In general, a subframe may be defined by RBs along the frequency axis and Orthogonal Frequency Division Multiplexing (OFDM) symbols along the time axis.

According to an embodiment of the present invention, the BS determines a modulation scheme for an R-CCE to be transmitted to a relay according to the quality of a backhaul link via which the BS conducts wireless communication with the relay. The modulation scheme may be, for example, Quadrature Amplitude Modulation (QAM) that transmits a signal by converting the amplitude and phase of a carrier or Quadrature Phase Shift Keying (QPSK) being a 4-phase PSK that transmits two bits in one code by shifting the phase of a carrier at every 90-degree interval.

In the embodiment of the present invention, the BS determines a modulation scheme for an R-PDCCH directed to a relay. The number of RBs and the indexes of OFDM symbols of a region allocated as the R-PDCCH for transmitting control information to the relay in a subframe are determined according to the modulation scheme determined by the BS.

A PDCCH on which control information is transmitted may include a plurality of Control Channel Elements (CCEs). A CCE that forms an R-PDCCH is referred to as an R-CCE. An R-CCE may be aggregated at level 1, 2, 4, ..., to be used, according to a modulation scheme.

Accordingly, once the BS determines the modulation scheme for the R-PDCCH and an R-CCE aggregation is determined according to the modulation scheme for the R-PDCCH, the number of REs and the index of OFDM symbol used for R-CCE transmission are determined. The symbol index may be preset or may be explicitly indicated by the BS during signal transmission. In the latter case, the BS may signal the symbol index to the relay by including information indicating each relay in a higher layer signal or may broadcast the symbol index in the form of cell-specific information to a plurality of relays or transmit the symbol index to each relay.

An R-CCE may be mapped to an R-PDCCH in units of an RB in a subframe. R-CCE size information, that is, RB size information according to an aggregation level may be explicitly signaled to each relay or may be preset for the relay according to a preset modulation scheme and used OFDM symbols. That is, once the number of RBs required to transmit one R-CCE is determined, a relay performs blind search based on the R-CCE size according to an R-CCE aggregation level. Thus, its search space is also determined. For example, if the BS transmits information indicating that the size of an R-CCE is four RBs to the relay, the relay performs blind search in units of four consecutive RBs in a subframe. In addition, each relay may have a different R-CCE size by R-CCE aggregation levels differentiated according to a relay-specific search space or a cell-specific search space.

Different numbers of RBs at various positions may be mapped for different relays according to their R-CCE sizes.

Figure 5:
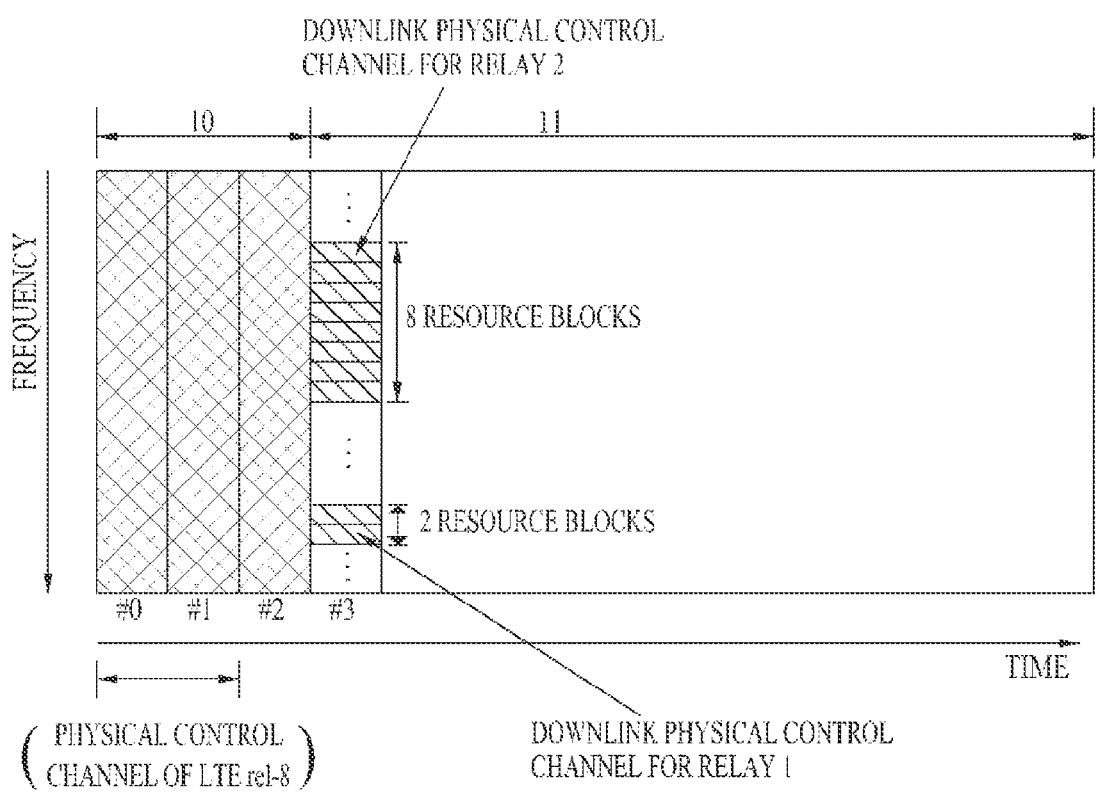
FIG. 5 illustrates an exemplary mapping of control channel elements in a subframe according to an embodiment of the present invention.

FIG. 5 illustrates an exemplary mapping of CCEs in a subframe according to an embodiment of the present invention. Specifically, the index of an OFDM symbol on the time axis is given and CCEs are mapped to different numbers of RBs on the frequency axis in a subframe, by way of example.

Referring to FIG. 5, a PDCCH region 10 is configured with a predetermined number of symbols in a subframe, for transmission of control information to UE(s). At least one R-PDCCH region may be configured in a predetermined area of the remaining subframe region 11, for transmission of control information to relay(s). R-PDCCH regions may be defined at different positions in the subframe, since the BS applies different modulation schemes to different relays.

In the embodiment of the present invention, for a given symbol index, the BS may determine a variable number of RBs for each relay according to the R-CCE aggregation levels. For example, it is assumed that an R-PDCCH region for each relay is defined in a fourth OFDM symbol, namely OFDM symbol #3 on the time axis, as illustrated in FIG. 5.

For instance, if the BS determines to apply 16 QAM to the R-PDCCH region of a first relay, it configures R-CCEs each including two RBs according to 16 QAM. Thus, one R-CCE should be mapped to two RBs. As illustrated in FIG. 5, the R-CCE may be transmitted in two RBs in symbol #3. That is, if a first search space in which the first relay will perform blind search is configured at R-CCE aggregation level 1, the first relay performs a total of eight blind decodings on RBs #0 to #15, each time on two RBs. If a second search space is configured at R-CCE aggregation level 2, the first relay performs a total of four blind decodings on RBs #16 to #31, each time on four RBs. If a third search space is configured at R-CCE aggregation level 4, the first relay performs a total of four blind decodings on RBs #32 to #63, each time on eight RBs.

In another example, if the BS determines to apply QPSK to the R-PDCCH region of a second relay, it sets R-CCEs each including four RBs according to QPSK. Thus, one R-CCE is mapped to four RBs. If the first search space in which the second relay will perform blind search is configured at R-CCE aggregation level 1, the second relay performs a total of four blind decodings on RBs #16 to #31, each time on four RBs. In the second search space with R-CCE aggregation level 2, the second relay performs a total of four blind decodings on RBs #32 to #63, each time on eight RBs, as illustrated in FIG. 5. In FIG. 5, R-CCEs with aggregation level 2 are mapped to eight RBs. Then, in a third search space with R-CCE aggregation level 4, the second relay performs a total of two blind decodings on RBs #64 to #95, each time on 16 RBs.

Figure 6:
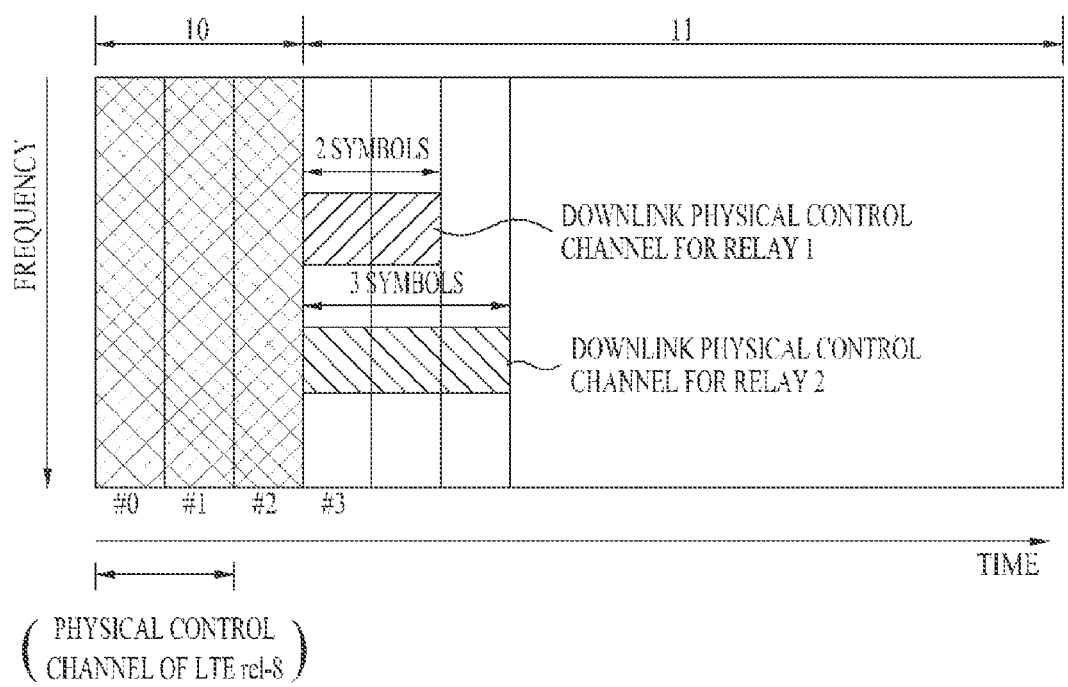
FIG. 6 illustrates another exemplary mapping of control channel elements in a subframe according to the embodiment of the present invention.

FIG. 6 illustrates another exemplary mapping of CCEs in a subframe according to the embodiment of the present invention. Specifically, an R-CCE is mapped to RBs in a variable number of symbols on the time axis, with the number of RBs fixed on the frequency axis, by way of example.

For the number of RBs configured by a BS for relay(s), an aggregation level of an R-CCE for a relay may be determined to be the number of OFDM symbols used for transmission of the R-CCE. An OFDM symbol is a single symbol unit and the number of symbols varies according to an R-CCE aggregation level.

Referring to FIG. 6, if an R-CCE aggregation level at an RB index preset by the BS is 2 for a first relay, the BS transmits an R-CCE to the first relay in two symbols. In another example, if an R-CCE aggregation level is 3 for a second relay, the BS transmits an R-CCE to the second relay in three symbols.

Once the number of vertical resource blocks needed to transmit one R-CCE, various search spaces may be determined based on the basic number of symbols needed to transmit one R-CCE according to an R-CCE aggregation level, in RBs with the same index.

Unlike the embodiments of the present invention illustrated in FIGS. 5 and 6, a modulation scheme for each relay may be changed in a given number of RBs on the frequency axis and a given number of symbols on the time axis. That is, the modulation scheme of an R-PDCCH may vary according to a search space, for a relay. For example, when a search space contains specific RBs and symbols set for R-PDCCH transmission to a relay, QPSK may be used in a first search space and 16 QAM in a second search space.

The above-described schemes for mapping CCEs to channel resources for blind search at a relay according to the embodiment of the present invention may be supported in a hybrid manner.

A BS may configure two or more R-PDCCHs for a relay according to an embodiment of the present invention.

Figure 7:
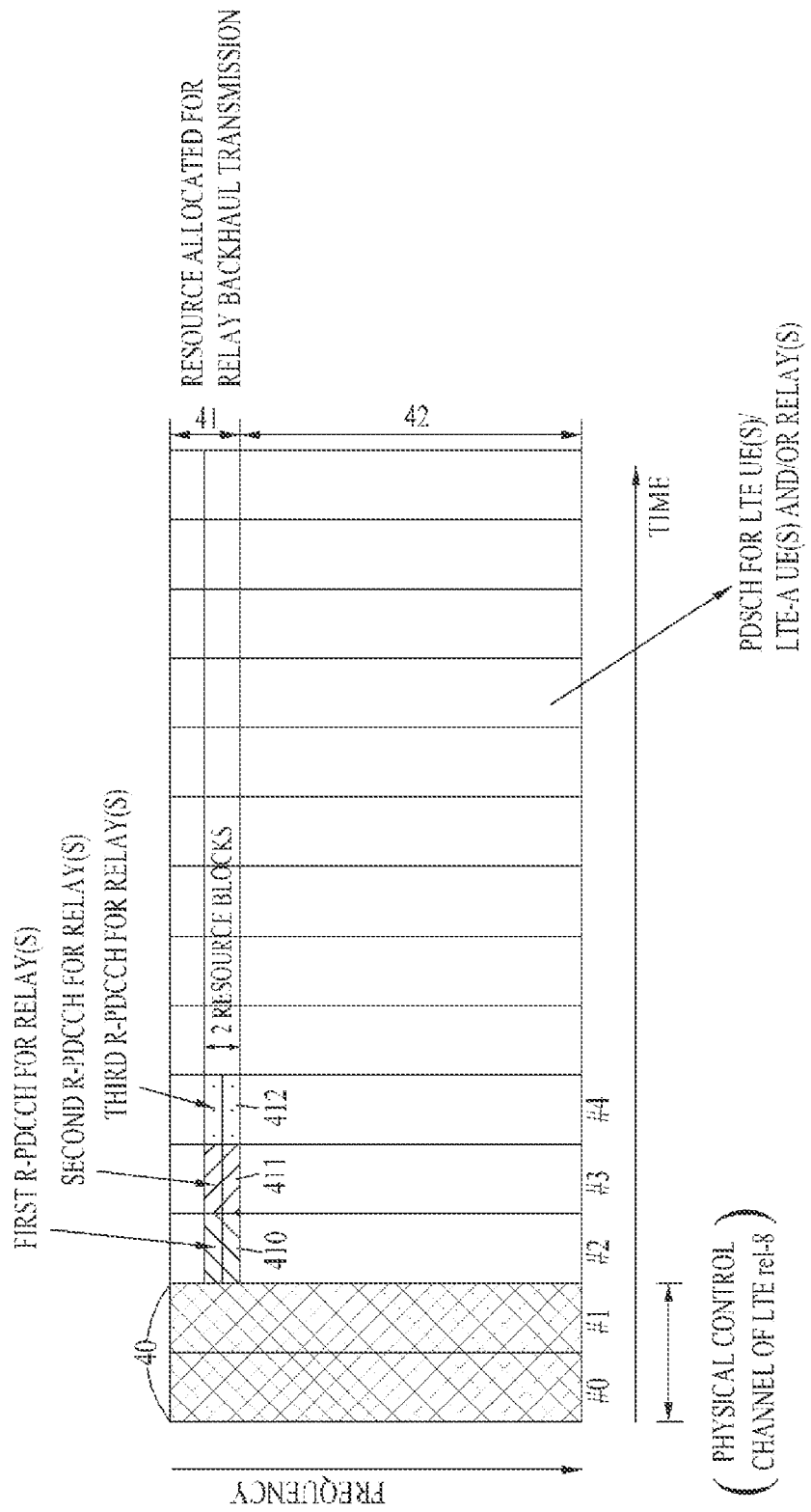
FIG. 7 illustrates an exemplary allocation of resources to a physical control channel for a relay in a subframe according to an embodiment of the present invention.

FIG. 7 illustrates an example of allocating the resources of a physical control channel to a relay in a subframe according to an embodiment of the present invention.

Referring to FIG. 7, a region 10 with predetermined symbols at the start of a subframe is a PDCCH region in which a BS transmits control information to UEs. The PDCCH region is multiplexed in TDM with a PDSCH region 11 used for the BS to transmit data to UEs. An R-PDCCH for a relay may be allocated in FDM to a predetermined area 41 corresponding to a specific frequency band in the PDSCH region 11. Herein, the BS may configure a plurality of R-PDCCHs for the relay in the subframe.

For example, a plurality of R-PDCCHs 410, 411 and 412 allocated to a relay may be multiplexed in TDM using consecutive OFDM symbols in the same RB region, as illustrated in FIG. 7. That is, R-PDCCHs for a specific relay are allocated to adjacent OFDM symbols of the same frequency band in TDM.

The BS may configure a first R-PDCCH region 410 in RBs #24 and #25 so as to transmit at least one R-CCE with two RBs in symbol #2. It is assumed that control information such as a UL scheduling grant is transmitted in the first R-PDCCH region 410 for the relay to transmit data on an R-PDSCH to the BS. The relay may succeed in receiving the UL scheduling grant in RBs #24 and #25 through blind search of the search space defined in symbol #3 by RBs #0 to #31.

Then the relay determines whether there is an additional R-PDCCH for it during blind search. That is, the relay may determine the presence of a second R-PDCCH region 411 in symbol #3 by RBs #24 and #25 corresponding to the first R-PDCCH region 410. When control information such as a DL scheduling grant is transmitted in the second R-PDCCH region 411 so that the BS can transmit data on an R-PDSCH to the relay, the relay may succeed in receiving the DL scheduling grant through blind decoding of the corresponding area. Likewise, the relay may detect the presence of a third R-PDCCH region 412 in symbol #4 adjacent to the symbol corresponding to the second R-PDCCH region 411 in the same RB region, RBs #24 and #25.

This operation may be iterated until the relay fails to search for another additional R-PDCCH region through corresponding blind decoding.

The remaining subframe region 42 may be used as a PDSCH or R-PDSCH region for data transmission.

While a plurality of R-PDCCH regions are shown in FIG. 7 as positioned in three adjacent symbols, the number of R-PDCCH regions may be set to a variable value, for example, 2 or less, or 3 or larger. In addition, a plurality of R-PDCCH regions may be positioned in FDM in adjacent RBs of the same OFDM symbol, compared to the case illustrated in FIG. 7.

As described above, the BS allocates channel resources at various positions to relays in a subframe, in FDM or TDM in the above resource allocation methods.

Embodiment 2

Now a description will be given of a semi-static resource allocation method according to another embodiment of the present invention, in which a BS predetermines resources for backhaul communication between the BS and a relay and signals the predefined resources to the relay.

In the embodiment of the present invention, the BS may predetermine a subframe pattern for backhaul communication, a specific frequency band in which a channel region is allocated to a relay in a subframe, a Modulation and Coding Scheme (MCS) level for the channel region, etc. during initial setup for each of a plurality of relays, taking into account the channel quality of a backhaul link, the cell size of the relay, and the traffic load of the relay. Even though a specific subframe pattern, a specific frequency band, and a specific MCS level have already been predefined for each relay, the BS may signal a modification to the relay by higher-layer signaling, when it is necessary to change at least one of setting states related to the subframe during backhaul communication.

Figure 8:
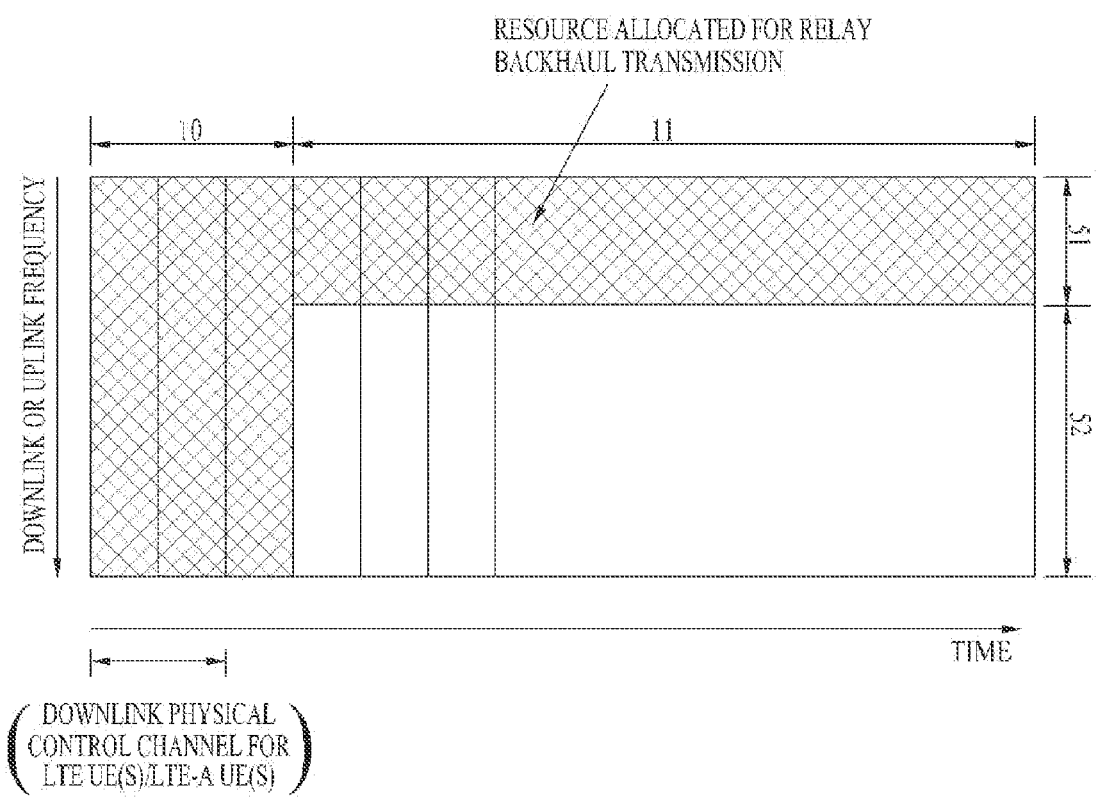
FIG. 8 illustrates an exemplary subframe according to another embodiment of the present invention.

FIG. 8 illustrates an exemplary subframe according to another embodiment of the present invention. Specifically, the subframe is configured by allocating resources to relays at a BS, by way of example.

In the case where a wireless backhaul communication resource region is predetermined between a relay and a BS, as illustrated in FIG. 7, there is no need for separately setting up a physical control channel between the BS and the relay. However, a physical Hybrid Automatic Repeat reQuest (HARM) Acknowledgment/Negative Acknowledgment (ACK/NACK) channel may need to be allocated to each relay, for error processing. In addition, it may also be necessary to define a New Data Indicator (NDI) separately from data in order to handle a NACK to ACK error. Accordingly, it is assumed in FIG. 8 that an R-PDCCH region is configured to transmit such minimum control information.

Referring to FIG. 8, a predetermined region 10 at the start of a subframe is set as a PDCCH region and the remaining area 11 of the subframe is set as a PDSCH/R-PDSCH region. A predetermined area 51 of the PDSCH/R-PDSCH region may be allocated in FDM as an R-PDSCH region for backhaul transmission between a relay and a BS and the remaining area 52 of the PDSCH/R-PDSCH region may be allocated as a PDSCH region for LTE/LTE-A UEs. In the embodiment of the present invention illustrated in FIG. 8, it is assumed that a resource region 51 allocated to a relay does not include an R-PDCCH region for transmission of control information. In this case, an ACK/NACK signal being a response signal for transmitted data and Channel Quality Information (CQI) in uplink may be piggybacked to a data packet.

Figure 9:
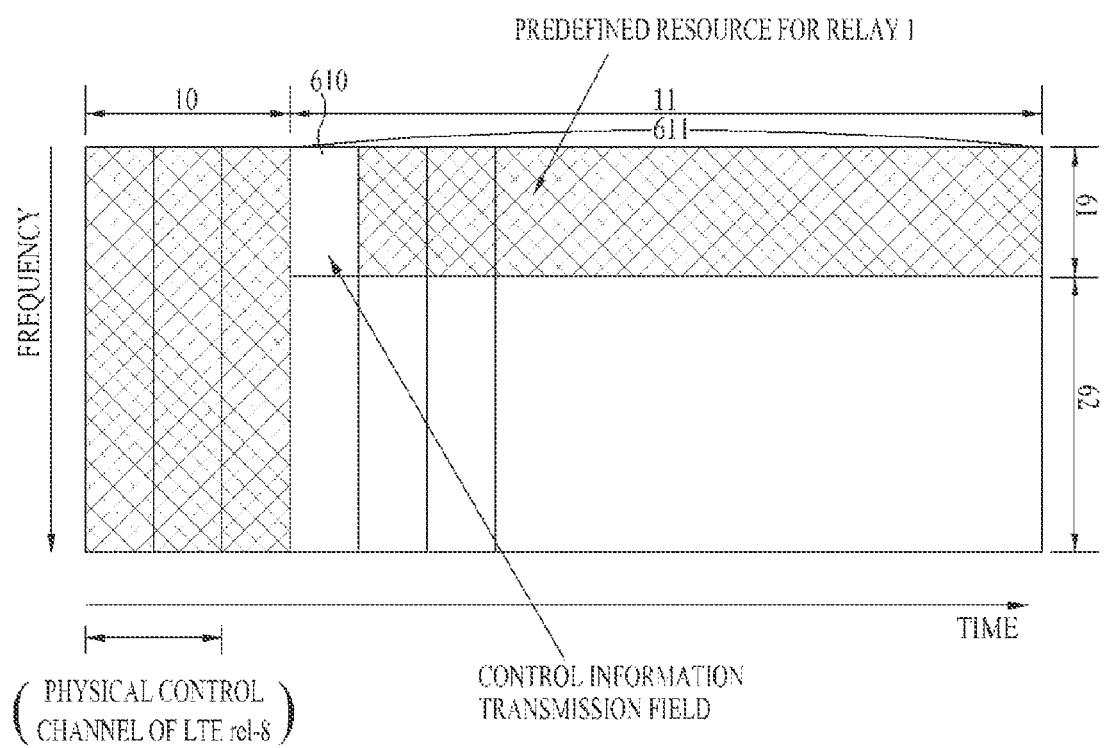
FIG. 9 illustrates another exemplary subframe according to the embodiment of the present invention.

FIG. 9 illustrates another exemplary subframe according to the embodiment of the present invention. Specifically, the subframe is another example configured by allocating resources to relays at a BS.

Referring to FIG. 9, a predetermined region 10 at the start of a subframe is configured as a PDCCH region as illustrated in FIG. 8 and the remaining area 11 of the subframe is configured as a PDSCH/R-PDSCH/R-PDCCH region. A predetermined area 61 of the PDSCH/R-PDSCH/R-PDCCH region is allocated in FDM as a backhaul transmission region for a relay. The backhaul transmission region may be divided into an R-PDCCH region 610 and an R-PDSCH region 611. To be more specific, when it is necessary to separately allocate an ACK/NACK channel for HARQ to each relay to cope with errors or to define an NDI field separately from a data transmission region, a BS may configure the R-PDCCH region 610 carrying control information separately from the R-PDSCH region 611. The BS may use the remaining area 62 of the subframe as a PDSCH region.

That is, the BS may allocate channel resources in such a manner that a predetermined area of a resource area predefined for a relay is used as a minimum physical control channel in the embodiment of the present invention illustrated in FIG. 9.

Now a description will be given of a hybrid resource allocation method for a relay according to a further embodiment of the present invention. Specifically, a Primary Backhaul Region (PBR) may be allocated to each relay as a main resource area for backhaul communication of the relay. A Secondary Backhaul Region (SBR) may further be allocated to the relay as an additional resource area, when needed, for example, when a signal is not completely transmitted in the PBR. Herein, PBR and SBRs may be used in the same meaning, as a channel resource area that a BS allocates to a relay.

Figure 10:
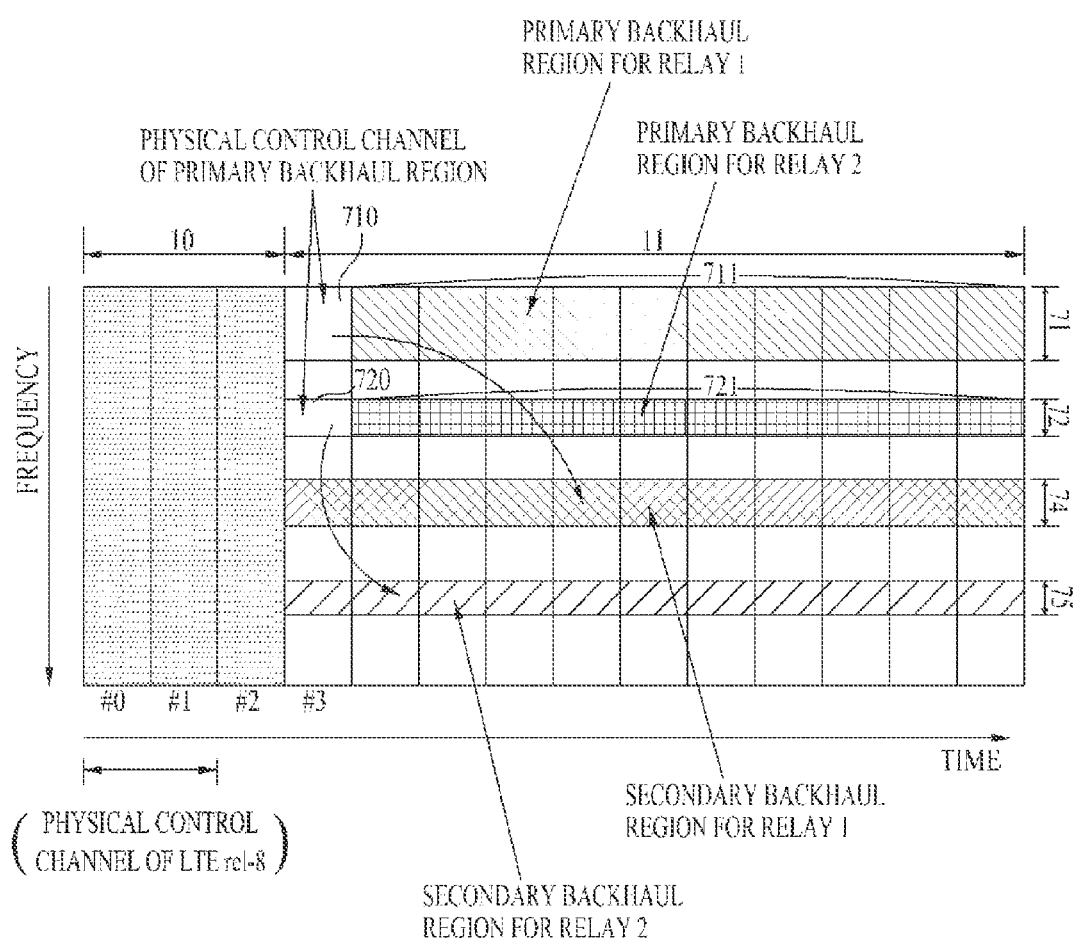
FIG. 10 illustrates an exemplary subframe according to a further embodiment of the present invention, when a BS allocates hybrid resources to a relay.

FIG. 10 illustrates an exemplary subframe, when a BS allocates resources to relays in a hybrid manner according to a further embodiment of the present invention. Specifically, the BS allocates resources separately to a plurality of relays in a subframe, by way of example.

Referring to FIG. 10, a predetermined region 10 including predetermined symbols at the start of a subframe corresponds to a PDCCH region that transmits control information from a BS to a UE. In the remaining area of the subframe, PBRs 71 and 72 at different positions are allocated to a plurality of relays. The PBRs 71 and 72 are resource regions that the BS predetermines during initial setup of the relays. These PRB regions 71 and 72 are first allocated independently to the relays. While resources are allocated to two relays in the illustrated case of FIG. 10 by way of example, resources at different positions in the same subframe may be allocated to two or more relays.

Once the backhaul regions for the relays are configured at different positions, backhaul region allocation information and a subframe pattern are signaled to each relay by a higher-layer signal during initial setup of each relay. The primary backhaul region of each relay may be changed upon request of the relay or by the BS. Information about changed backhaul region may be transmitted to the relay by a higher-layer signal.

Areas 710 and 720 defined in a predetermined symbol within the PBRs 71 and 72 correspond to R-PDCCHs for transmission of control information to the relays. That is, the R-PDCCH regions 710 and 720 may be multiplexed in FDM or TDM with R-PDSCH regions 711 and 721 for data transmission within the PBRs 71 and 72 separately allocated to the relays.

Typically, information about the MCS levels of the PBRs and ACK/NACK information based on HARQ of the relays are transmitted in the R-PDCCH regions 710 and 720. If the BS needs to allocate additional backhaul region to a relay, the BS may transmit information indicating the presence or absence of SBR, information about the position of the SBR that may be represented by a symbol index and resource allocation information on the time-frequency axis, and information about MCS level for the SBR to the relay on a corresponding R-PDCCH 710 or 720.

Referring to FIG. 10, the BS may transmit information indicating allocation of an SBR for the first relay in a specific area 74 of the subframe to the first relay on the R-PDCCH region defined in the PBR. Therefore, the first relay may detect the R-PDCCH by blind search in the PBR. If the first relay successfully receives control information on the R-PDCCH, it may acquire information about the SBR, which obviates the need for blind search of the SBR. Likewise, the second relay may be aware from the R-PDCCH in the PBR that the SBR has been additionally allocated to the second relay in another specific area 75 of the subframe.

Figure 11:
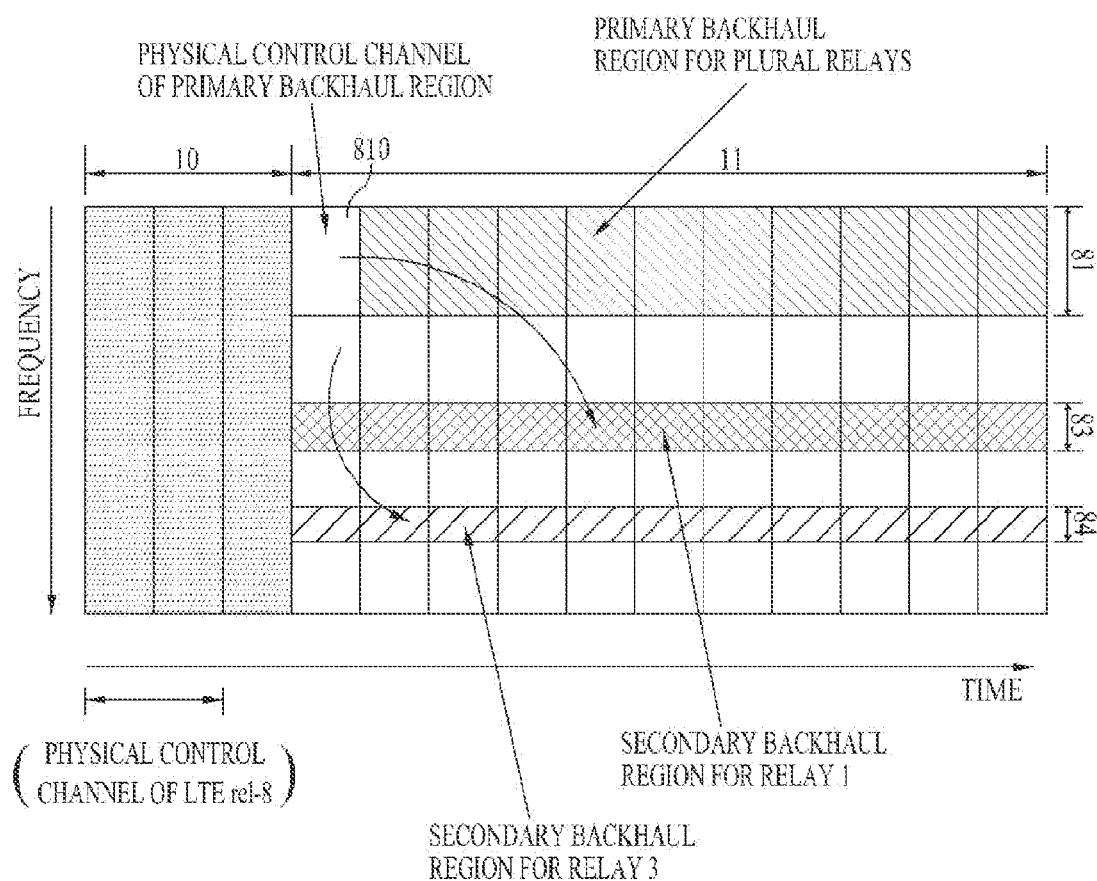
FIG. 11 illustrates another exemplary subframe according to the further embodiment of the present invention, when a BS allocates hybrid resources to a relay.

FIG. 11 illustrates another exemplary subframe, when a BS allocates resources to relays in a hybrid manner according to the further embodiment of the present invention. Specifically, common channel resources are primarily allocated to a plurality of relays in a subframe, by way of example.

Referring to FIG. 11, a BS pre-configures a PRB region 81 for a plurality of relays in a specific area of the remaining region 11 of the subframe except a PDCCH region 10. The plurality of relays share the common PBR 81 and the PBR 81 may be determined according to the minimum or maximum amount of resources needed to transmit control information and data to the plurality of relays. A specific symbol of the PBR 81 may be allocated as an R-PDCCH region 810 to transmit control information to relays and the remaining area of the PBR 81 may be allocated as an R-PDSCH region 811 for data transmission through multiplexing with the R-PDCCH region 810. Since the plurality of relays share the PBR 81, resource allocation information and ACK/NACK information for HARQ for the plurality of relays may be transmitted in the R-PDCCH region 810. In addition, the R-PDCCH region 810 may carry information about the presence of absence of an SBR for each relay, information about the position and size of the SBR, and information about the MCS level of the SBR to the relay. When resources are additionally allocated to individual relays, SBRs 83 and 84 for the individual relays may be disposed to different sizes at different positions. Unlike the case of FIG. 11, if the same amount of resources are allocated to the plurality of relays, a single SBR is configured to be shared among the plurality of relays.

Figure 12:
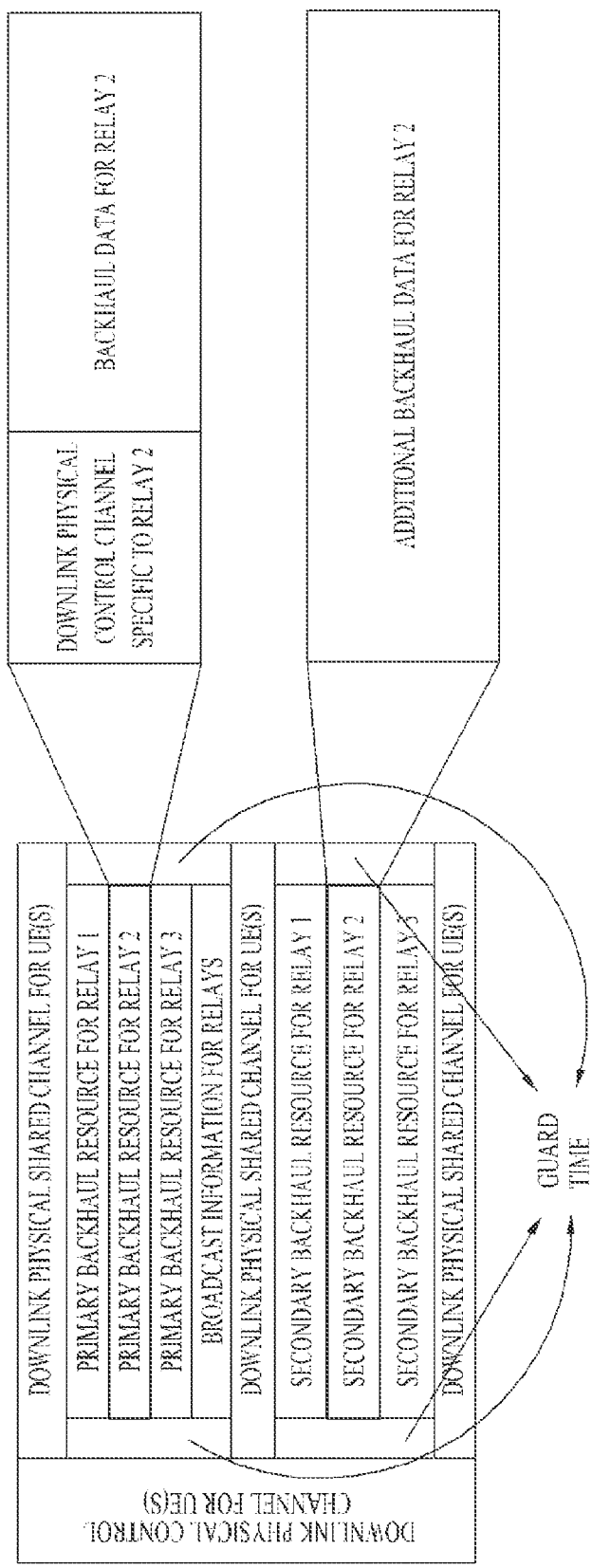
FIG. 12 illustrates a further exemplary subframe according to the further embodiment of the present invention, when a BS allocates hybrid resources to a relay.

While resources are allocated to relays in TDM in FIGS. 11 and 12, the resource allocation may be performed in FDM. The methods for mapping R-CCEs to resource elements and the blind search methods for relays as described before with reference to FIGS. 5 to 9 are also applicable to the embodiments of FIGS. 10 and 11.

A description will be given below of a method for configuring a PBR, in the hybrid resource allocation scheme in which a BS first allocates a PBR and then, when needed, allocates an SBR according to the above-described embodiments of the present invention.

FIG. 12 illustrates another exemplary subframe according to another embodiment of the present invention, when a BS allocates resources to a relay in a hybrid manner.

Referring to FIG. 12, a specific region at the start of a subframe may be configured as a PDCCH region used to transmit control information from a BS to a UE, and the remaining area of the subframe may be divided into a PDSCH region used to transmit data from the BS to a UE and a channel region for a relay according to the embodiment of the present invention.

In FIG. 12, PBRs are separately configured for a plurality of relays in FDM in a specific area of a PDSCH region and SBRs are additionally configured for the plurality of relays in FDM in another specific area of the PDSCH region, as illustrated in FIG. 10. One or more symbols may be allocated for R-PDCCH transmission in each of the PBRs and the other symbols of the PBR may be allocated for R-PDSCH transmission.

According to the embodiment of the present invention, the other symbols than the symbol allocated for R-PDCCH transmission in a PBR allocated to a specific relay may be used for R-PDSCH transmission to the specific relay or for R-PDSCH transmission to another relay or PDSCH transmission to a UE.

In a corresponding PBR, the other symbols may be used through puncturing of the symbol used for R-PDCCH transmission or through rate matching. R-PDSCH resource allocation information for the relay or PDSCH resource allocation information for the UE may be transmitted to the relay or the UE on the R-PDCCH. Information about the punctured symbol or unused symbols may be transmitted together on the R-PDCCH.

According to the embodiment of the present invention, OFDM symbols at preset positions may be allocated to the R-PDCCH in the PBR. For example, two symbols #3 and #4 may be preset for R-PDCCH transmission in the PBR, and information indicating whether a corresponding RB belongs to a backhaul region for an R-PDCCH of a specific relay or a general PDSCH region may be transmitted in control information transmitted on the R-PDCCH.

Information about symbols used for an R-PDCCH in a PBR may be transmitted to a relay or a UE by RRC signaling or broadcast in system information. Alternatively, symbols are predefined for the R-PDCCH and implicitly signaled without transmitting symbol index information.

In the embodiment of the present invention, the BS may configure resource allocation information about an R-PDCCH (e.g. information about the position or size of a backhaul region for a relay) in the backhaul region during initial setup of the relay, or transmit update information to the relay by RRC signaling, when the resource allocation information is changed.

PBR allocation information for each relay includes information about the start, resource mapping scheme, and size of the PBR.

The information about the start of the PBR is information about the start of the PBR on the frequency axis, specifically the index M of a virtual resource block (VRB). M is the index of the first RB of the PBR.

The resource mapping scheme of the PBR refers to a scheme of mapping the PBR to a resource area including VRBs and Physical Resource Blocks (PRBs), which is localized mapping or distributed mapping. The PBR is mapped to a specific local positions in localized mapping, whereas it is mapped to distributed positions in distributed mapping. For instance, when a PBR is allocated to a specific relay, the PBR of the specific relay may be mapped to localized or distributed VRBs and PRBs. On the other hand, in case of a mobile relay, a PBR may be mapped in the distributed mapping scheme for the mobile relay.

The PBR size information may indicate the number N of RBs in the PBR. The PBR may be defined by the index of the starting RB, M and the total number of RBs in the PRB, N. In the above example, the PBR of the relay occupies an RB with index M to an RB with index N+M−1.

As described before, resource mapping may be carried out relay-specifically. Alternatively, when the BS specifies only a subframe without specifying a relay and without transmitting additional indication information about a resource mapping scheme, each relay may perform blind search for an R-PDCCH based on localized mapping or distributed mapping. In this case, when a relay that performs blind search on the assumption of localized mapping fails in blind decoding of an R-PDCCH in its PRB, the relay may perform blind decoding, considering that the BS has allocated resources through distributed mapping.

In this manner, the relay may receive information about a backhaul region that the BS has allocated to the relay by blind search of total frequency bands or sub-frequency bands of the system including the BS.

If an aggregation level is configured for RBs of the resource area allocated to the relay as described before with reference to FIGS. 5 and 6, a BS may transmit information about the aggregation level thereby obviating the need for the relay to perform blind search.

Alternatively, information about the mapping scheme of mapping a PBR to VRBs and PRBs may be transmitted to the relay during initial setup of the relay, or when the mapping scheme information has been changed, information about the changed mapping scheme may be transmitted to the relay by an RRC signal, in order to reduce the number of blind searches at the relay. Or information about VRB and PRB mapping in a corresponding backhaul subframe may be transmitted preliminarily to each rely by RRC signaling.

To broadcast system information to relays, each relay may be allocated a cell common ID by the BS and may perform blind search for the cell common ID. An RB aggregation level for the blind search is commonly applied to the relays. The BS may transmit the RB aggregation level to each relay by RRC signaling or broadcast it to a plurality of UEs or relays, during initial setup of the relays.

Localized mapping or distributed mapping may be predefined for a control channel that carries the broadcast information. Information about the mapping scheme may also be transmitted to each relay by RRC signaling.

According to another embodiment of the present invention, when an R-PDCCH is allocated to a relay in the afore-described embodiments, a simplified form may be used to reduce the overhead of transmitting control information in a corresponding area.

When a relay is deployed for wireless communication between a BS and a UE, the BS sets some of the characteristics of a transmission mode as permanent, based on antenna configurations, channel measurement results, etc. between the BS and a plurality of relays and transmits information about the settings to each relay by higher-layer signaling. Then, when the transmission mode is changed according to a changed channel state, the BS transmits information about the changed transmission mode to each relay by higher-layer signaling. Herein, the BS may transmit only information about an MCS level and resource allocation information in a UL/DL scheduling grant on an allocated R-PDCCH to each relay.

Or, the BS may predefine an MCS level for each relay, taking into account the channel quality of a backhaul link used for wireless communication between the BS and the relay, and may transmit information about physical resource mapping to each relay on an R-PDCCH. The information about physical resource mapping contains information about the position of a backhaul region allocated to the relay on the time-frequency axes. Or, when the BS transmits information indicating the MCS level of the backhaul region on the R-PDCCH, adaptive HARQ is applicable.

A relay and a BS (e.g. an FBS or an MBS) according to an embodiment of the present invention, for implementing the afore-described embodiments of the present invention will be described below.

A relay is an entity designed to enable active wireless communication between a UE and a BS. In relation to the BS, the relay may serve as a transmitter on an uplink and as a receiver on a downlink. In addition, the BS may serve as a receiver on the uplink and as a transmitter on the downlink. That is, each of the relay and the BS may include a transmitter for transmission of information or data and a receiver.

Each of the relay and the BS may operate as a transmitter and a receiver and may include a processor, a module, a part and/or means for implementing the embodiments of the present invention. Especially to act as a transmitter and a receiver, the relay and the BS may be provided with a message encryption module (means), a message decryption module, and an antenna through messages are transmitted and received. An example of such a relay and a BS system will be described below with reference to FIG. 13.

Figure 13:
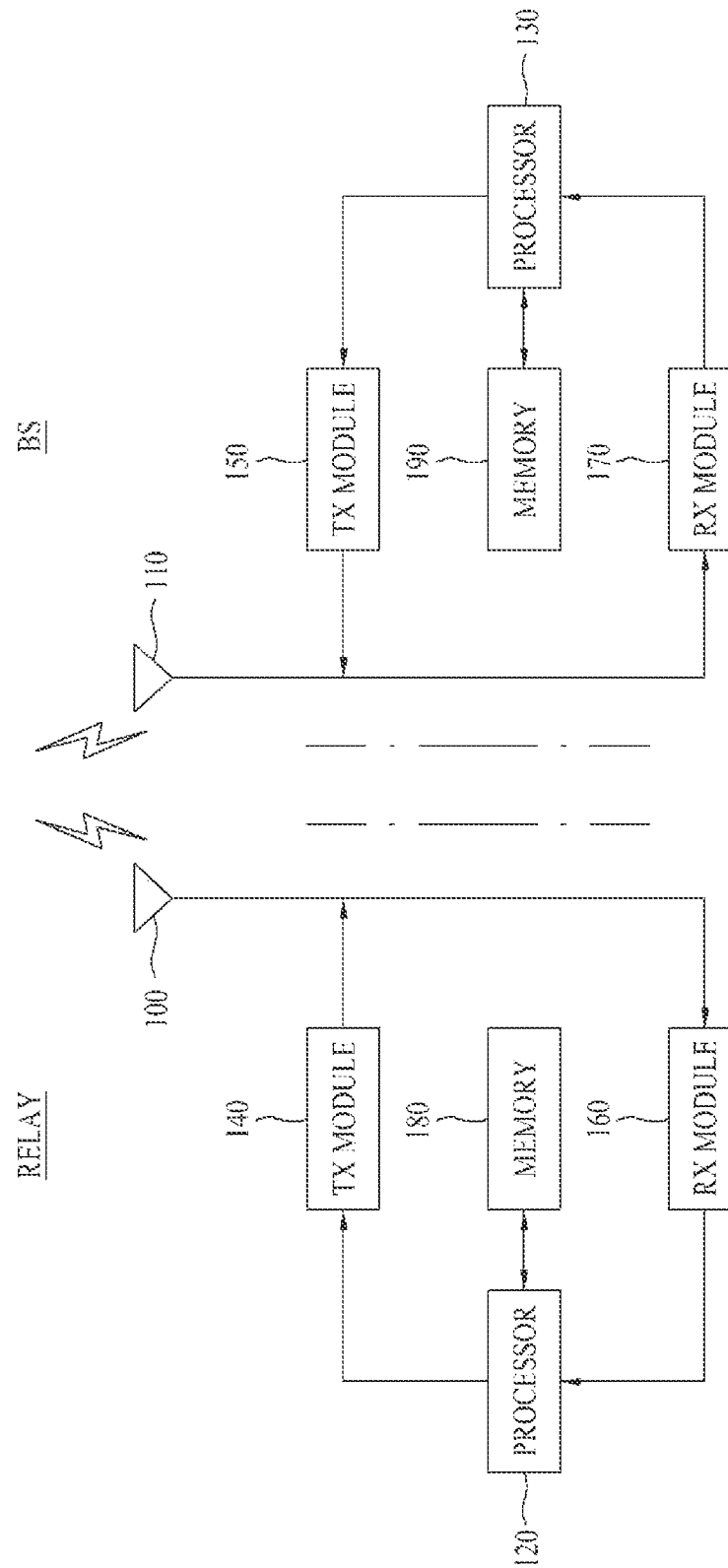
FIG. 13 is an exemplary block diagram of a relay and a BS according to an embodiment of the present invention.

FIG. 13 is a block diagram illustrating an exemplary structure of a relay and a BS according to an embodiment of the present invention.

Referring to FIG. 13, a relay structure and a BS structure are illustrated on the left and right sides, respectively. Each of the relay and the BS may include an antenna 100 or 110, a processor 120 or 130, a Transmission (Tx) module 140 or 150, a Reception (Rx) Rx module 160 or 170, and a memory 180 or 190. Components of the relay and the BS may perform functions matching to each other. Now each component will be described in greater detail.

The antennas 100 and 110 include Tx antennas for transmitting signals generated from the Tx modules 140 and 150 to the outside and Rx antennas for receiving radio signals externally and providing the received radio signals to the Rx modules 160 and 170. When MIMO is supported, two or more antennas may be provided to each of the relay and the BS.

The processors 120 and 130 typically control overall operation of the relay and the BS, respectively. Especially the processors 120 and 130 may control PDCCH/PDSCH/R-PDCCH/R-PDSCH transmission/reception to implement the embodiments of the present invention. When channel resources are allocated separately to relays, the processor 120 and 130 may determine the various channel resource allocation schemes as described in the embodiments of the present invention and may configure one or more subframes by allocating resources according to the channel resource allocation schemes. In addition, the processors 120 and 130 may control transmission of information about the size, position, or resource mapping of an allocated resource area, for example, an afore-described backhaul region by higher-layer signaling such as RRC signaling.

Meanwhile, the processor 120 of the relay performs blind search in a system frequency to detect its R-PDCCH in a subframe.

The Tx modules 140 and 150 may encode and modulate data which was scheduled by the processors 120 and 130 and is to be transmitted to the outside, in a predetermined coding and modulation scheme, and then may provide the modulated data to the antennas. Unlike FIG. 13, a Tx module and an antenna may be incorporated into a transmitter for transmitting a radio signal.

The Rx modules 160 and 170 may recover external radio signals received through the antennas 100 and 110 to the original data by decoding and demodulating them and then may provide the recovered data to the processors 120 and 130. An Rx module and an antenna may be incorporated into a receiver for receiving radio signals, unlike FIG. 13.

The memories 160 and 170 may store programs for processing and controlling in the processors 120 and 130 and may temporarily store input/output data (in case of the relay, a UL grant allocated by the BS), system information, an STID, an FID, information about an action time, etc. In addition, each of the memories 160 and 170 may include at least one of a flash memory-type storage medium, a hard disk-type storage medium, a multimedia card micro-type storage medium, a card-type memory (e.g. an SD or XD memory), a Random Access Memory (RAM), a Static Random Access Memory (SRAM), a Read-Only Memory (ROM), an Electrically Erasable Programmable ROM (EEPROM), a magnetic disk, and an optical disk.

Meanwhile, at least one of the afore-described modules in the BS may perform a control function for performing the afore-described embodiments of the present invention, Orthogonal Frequency Division Multiple Access (OFDMA) packet scheduling, a TDD packet scheduling and channel multiplexing function, a Medium Access Control (MAC) frame conversion control function according to service characteristics and a propagation environment, a real-time control function of high-speed traffic, a handover function, an authentication and encryption function, a packet modulation and demodulation function for data transmission, a high-speed packet channel coding function, a real-time modem control function, etc. Or the BS may include an additional means, module, or part for performing these functions.

The processor of each of the relay and the BS may have a layered protocol architecture including a physical layer at Layer 1, and a MAC layer and an RRC layer at Layer 2.

Figure 14:
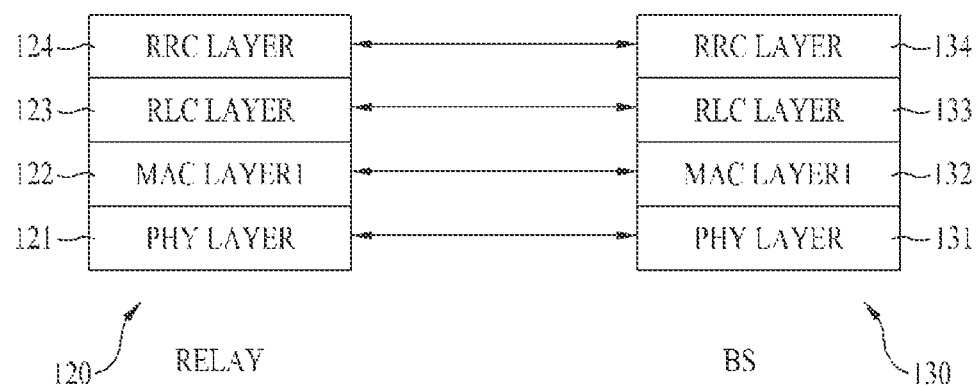
FIG. 14 illustrates an exemplary radio interface protocol architecture conforming to a wireless access network standard between a relay and a BS according to an embodiment of the present invention.

FIG. 14 illustrates an exemplary radio interface protocol architecture conforming to a wireless access network standard between a relay station and a BS according to an embodiment of the present invention.

In FIG. 4, a radio interface protocol stack horizontally includes a PHYsical (PHY) layer, a data link layer, and a network layer and vertically includes a User plane (U-plane) for transmission of data information and a Control plane (C-plane) for control signaling.

Specifically, FIG. 14 illustrates each layer of the radio protocol C-plane between a relay and a BS. The protocol layers of FIG. 14 may be divided into L1, L2 and L3 based on the three lowest layers of the OSI reference model.

Each layer of the radio protocol C-plane illustrated in FIG. 14 will be described below.

PHY layers 121 and 131 at L1 provide an information transfer service to a higher layer via physical channels. The PHY layers 121 and 131 are connected to their higher MAC layers 122 and 132 via transport channels. Data is transferred between the MAC layers 122 and 132 and the PHY layers 121 and 131 via the transport channels. The transport channels are largely classified into dedicated transport channels and common transport channels depending on whether the transport channels are shared or not. Data is transferred between different PHY layers, that is, between a transmitter and a receiver, on physical channels occupying radio resources.

There are a plurality of layers at L2. The MAC layers 122 and 132 map various logical channels to various transport channels. The MAC layers 122 and 132 also multiplex a plurality of logical channels into one transport channel. The MAC layers are connected to their higher Radio Link Control (RLC) layers 123 and 133 via logical channels. The logical channels may be largely divided into control channels for carrying C-plane information and traffic channels for transmitting U-plane information, according to the types of transmitted information.

At L2, the RLC layers 123 and 133 adjust the size of data received from a higher layer through segmentation and concatenation so that a lower layer can transmit data in the air interface. In addition, the RLC layers 123 and 133 provide three operation modes, Transparent Mode (TM), Un-acknowledged Mode (UM), and Acknowledged Mode (AM) to ensure various Quality of Service (QoS) requirements of Radio Bearers (RBs). Especially, an AM RLC performs a retransmission function through Automatic Repeat Request (ARQ), for reliable data transmission.

RRC layers 124 and 134 at the highest of L3 are defined only on the C-plane. They are responsible for controlling logical channels, transport channels, and physical channels in relation to configuration, reconfiguration, and release of RBs. An RB refers to a logical path provided at L1 and L2 of radio protocols, for data transmission between a UE and a UTRAN. In general, configuring an RB is to define the characteristics of radio protocol layers and channels needed to provide a specific service and set specific parameters and an operation method for each of the radio protocol layers and channels. RBs are further divided into Signaling RB (SRB) and Data RB (DRB). An SRB is used as a path of an RRC message on the C-plane and a DRB is used as a path of user data on the U-plane.

An RRC signal generated from the RRC layer 134 of the BS includes information about a resource allocation area that the BS allocates to a relay according to an embodiment of the present invention. More specifically, when the BS configures an R-PDCCH for a relay in a subframe, it may transmit information about RBs or OFDM symbols of the R-PDCCH to the relay by RRC signaling. In addition, the BS transmits information about a change in an overall subframe pattern, the size of a frequency band corresponding to a channel region allocated to the relay, or the MCS level of the channel region to the relay by RRC signaling. When the channel resource allocation area of the relay is changed during wireless communication, the BS transmits information about the changed channel resource allocation area to the relay by RRC signaling.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

Industrial Applicability

The embodiments of the present invention are applicable to various wireless access systems. The various wireless access systems include, for example, a 3GPP system, a 3GPP2 system, and/or an IEEE 802.xx system. The embodiments of the present invention can be applied to all technical fields using applications of the various wireless access systems as well as to the various wireless access systems.

The invention claimed is:

1. A method for transmitting a signal to a relay at a Base Station (BS), the method comprising:
    transmitting, by the BS to the relay in a primary backhaul region for the relay in a subframe, a second Physical Downlink Control Channel (R-PDCCH) carrying second control information for the relay; and
    according to the second control information, transmitting, by the BS to the relay in the subframe, a data channel carrying data for the relay,
    wherein the R-PDCCH is transmitted using a specific frequency band in the primary backhaul region of the subframe other than a first resource area of the subframe that is used for transmission of a first Physical Downlink Control Channel (PDCCH) carrying first control information for a User Equipment (UE), and
    wherein the data channel corresponding to the R-PDCCH is transmitted only within a same frequency band in the subframe as the specific frequency band occupied by the R-PDCCH in the subframe, and
    wherein the R-PDCCH further carries information on a secondary backhaul region allocated additionally for the relay in the subframe when the primary backhaul region is insufficient for signal transmission to the relay.

2. The method according to claim 1, further comprising:
    transmitting, to the relay, resource information indicating the primary backhaul region used for the relay,
    wherein the primary backhaul region is configured with a plurality of resource blocks, and the resource information includes information indicating a starting resource block of the primary backhaul region and a number of the plurality of resource blocks in the primary backhaul region.

3. The method according to claim 1, further comprising:
    transmitting information indicating a symbol allocated to the primary backhaul region to the relay.

4. The method according to claim 1, wherein the subframe in which the R-PDCCH is transmitted is a multicast/broadcast single-frequency network (MBSFN) subframe.

5. The method according to claim 1, wherein the information on the secondary backhaul region includes at least presence of the secondary backhaul region, a position of the secondary backhaul region in the subframe or a modulation and coding scheme (MCS) level for the secondary backhaul region.

6. A method for receiving a signal from a Base Station (BS) at a relay, the method comprising:
    receiving, from the BS by the relay in a primary backhaul region for the relay in a subframe, a second Physical Downlink Control Channel (R-PDCCH) carrying second control information for the relay; and
    according to the second control information, receiving, from the BS by the relay in the subframe, a data channel carrying data for the relay,
    wherein the R-PDCCH is received using a specific frequency band in the primary backhaul region of the subframe other than a first resource area of the subframe that is used for receiving a first Physical Downlink Control Channel (PDCCH) carrying first control information for a User Equipment (UE),
    wherein the data channel corresponding to the R-PDCCH is transmitted only within a same frequency band in the subframe as the specific frequency band occupied by the R-PDCCH in the subframe, and
    wherein the R-PDCCH further carries information on a secondary backhaul region allocated additionally for the relay in the subframe when the primary backhaul region is insufficient for signal transmission to the relay.

7. The method according to claim 6, further comprising:
    receiving, from the BS, resource information indicating the primary backhaul region allocated for the relay,
    wherein the primary backhaul region is configured with a plurality of resource blocks and the resource information includes information indicating a starting resource block of the primary backhaul region and a number of the plurality of resource blocks in the primary backhaul region.

8. The method according to claim 6, further comprising:
receiving information indicating a symbol used for the primary backhaul region from the BS.

9. The method according to claim 6, wherein the subframe in which the R-PDCCH is received is a multicast/broadcast single-frequency network (MBSFN) subframe.

10. The method according to claim 6, wherein the information on the secondary backhaul region includes at least presence of the secondary backhaul region, a position of the secondary backhaul region in the subframe or a modulation and coding scheme (MCS) level for the secondary backhaul region.

11. A Base station (BS) configured to transmit a signal to a relay, the BS comprising:
a transmitter configured to transmit a radio signal; and
a processor configured to control operations of the transmitter to:
transmit, to the relay in a primary backhaul region for the relay in a subframe, a second Physical Downlink Control Channel (R-PDCCH) carrying second control information for the relay; and
according to the second control information, transmit, to the relay in the subframe, a data channel carrying data for the relay,
wherein the R-PDCCH is transmitted using a specific frequency band in the primary backhaul region of the subframe other than a first resource area of the subframe that is used for transmission of a first Physical Downlink Control Channel (PDCCH) carrying first control information for a User Equipment (UE),
wherein the data channel corresponding to the R-PDCCH is transmitted only within a same frequency band in the subframe as the specific frequency band occupied by the R-PDCCH in the subframe,
wherein the data R-PDCCH further carries information on a secondary backhaul region allocated additionally for the relay in the subframe when the primary backhaul region is insufficient for signal transmission to the relay.

12. The BS according to claim 11, wherein the processor is further configured to
control the transmitter to transmit, to the relay, resource information indicating the primary backhaul region allocated for the relay, and
configure the primary backhaul region with a plurality of resource blocks, wherein the resource information which includes information indicating a starting resource block of the primary backhaul region and a number of the plurality of resource blocks in the primary backhaul region.

13. The BS according to claim 11, wherein the processor is further configured to control the transmitter to transmit information indicating a symbol used for the primary backhaul region to the relay.

14. The BS according to claim 11, wherein the subframe in which the R-PDCCH is transmitted is a multicast/broadcast single-frequency network (MBSFN) subframe.

15. The BS according to claim 11, wherein the information on the secondary backhaul region includes at least presence of the secondary backhaul region, a position of the secondary backhaul region in the subframe or a modulation and coding scheme (MCS) level for the secondary backhaul region.

16. A relay configured to receive a signal from a Base Station (BS), the relay comprising:
a receiver configured to receive a radio signal; and
a processor configured to control operations of the receiver to:
receive, from the BS in a primary backhaul region for the relay in a subframe, a second Physical Downlink Control Channel (R-PDCCH) carrying second control information for the relay; and
according to the second control information, receive, from the BS in the subframe, a data channel carrying data for the relay,
wherein the R-PDCCH is received using a specific frequency band in the primary backhaul region of the subframe other than a first resource area of the subframe that is used for receiving a first Physical Downlink Control Channel (PDCCH) carrying first control information for a User Equipment (UE),
wherein the data channel corresponding to the R-PDCCH is transmitted only within a same frequency band in the subframe as the specific frequency band occupied by the R-PDCCH in the subframe,
wherein the R-PDCCH further carries information on a secondary backhaul region allocated additionally for the relay in the subframe when the primary backhaul region is insufficient for signal transmission to the relay.

17. The relay according to claim 16,
wherein the processor is further configured to control the receiver to receive, from the BS, resource information indicating the primary backhaul region allocated for the relay, and
wherein the second resources block is configured with a plurality of resource blocks and the resource information includes information indicating a starting resource block of the primary backhaul region and a number of the plurality of resource blocks in the primary backhaul region.

18. The relay according to claim 16, wherein the processor is further configured to control the receiver to receive information indicating a symbol used for the primary backhaul region from the BS.

19. The relay according to claim 16, wherein the subframe in which the R-PDCCH is received is a multicast/broadcast single-frequency network (MBSFN) subframe.

20. The relay according to claim 16, wherein the information on the secondary backhaul region includes at least presence of the secondary backhaul region, a position of the secondary backhaul region in the subframe or a modulation and coding scheme (MCS) level for the secondary backhaul region.

* * * * *